US007334844B2

(12) United States Patent
Barackman et al.

(10) Patent No.: US 7,334,844 B2
(45) Date of Patent: Feb. 26, 2008

(54) COMPOSITE SHELL SPACECRAFT SEAT

(75) Inventors: Victor J. Barackman, Chula Vista, CA (US); John K. Pulley, Huntington Beach, CA (US); Xavier D. Simon, Huntington Beach, CA (US); Sandra D. McKee, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 366 days.

(21) Appl. No.: 10/905,483

(22) Filed: Jan. 6, 2005

(65) Prior Publication Data

US 2006/0145021 A1 Jul. 6, 2006

(51) Int. Cl.
*A47C 7/02* (2006.01)
(52) U.S. Cl. .............................. 297/452.17; 297/452.28
(58) Field of Classification Search ........... 297/452.17, 297/284.1, 440.2, 440.22, 452.28
See application file for complete search history.

(56) References Cited

U.S. PATENT DOCUMENTS

| | | | | |
|---|---|---|---|---|
| 3,608,961 A | * | 9/1971 | Von Heck ................. | 297/284.1 |
| 4,347,213 A | * | 8/1982 | Rogers, Jr. ................. | 264/510 |
| 4,890,885 A | * | 1/1990 | Grossmann .............. | 297/284.1 |
| 5,154,185 A | * | 10/1992 | Latimer et al. ................. | 5/628 |
| 5,626,150 A | | 5/1997 | Johnson et al. | |
| 5,913,412 A | | 6/1999 | Huber et al. | |
| 6,066,107 A | | 5/2000 | Habermeyer | |
| 6,209,962 B1 | * | 4/2001 | Sobel et al. ........... | 297/452.17 |

* cited by examiner

*Primary Examiner*—Anthony D. Barfield
(74) *Attorney, Agent, or Firm*—Ostrager Chong Flaherty & Broitman P.C.

(57) ABSTRACT

A two-part seat (10) providing full body support that is specific for each crew member (30) on an individual basis. The two-part construction for the seat (10) can accommodate many sizes and shapes for crewmembers (30) because it is reconfigurable and therefore reusable for subsequent flights. The first component of the two-part seat construction is a composite shell (12) that surrounds the crewmember's entire body and is generically fitted to their general size in height and weight. The second component of the two-part seat (10) is a cushion (20) that conforms exactly to the specific crewmember's entire body and gives total body support in more complex environment.

20 Claims, 2 Drawing Sheets

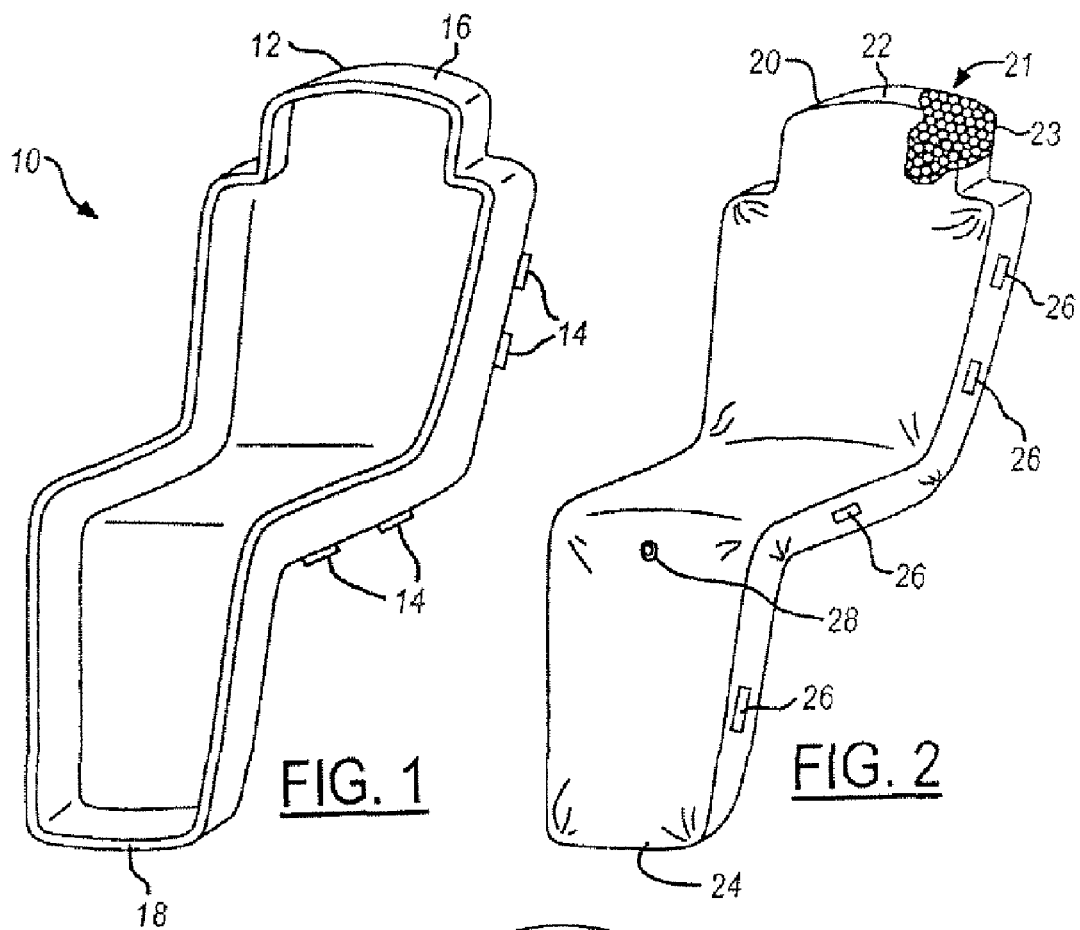
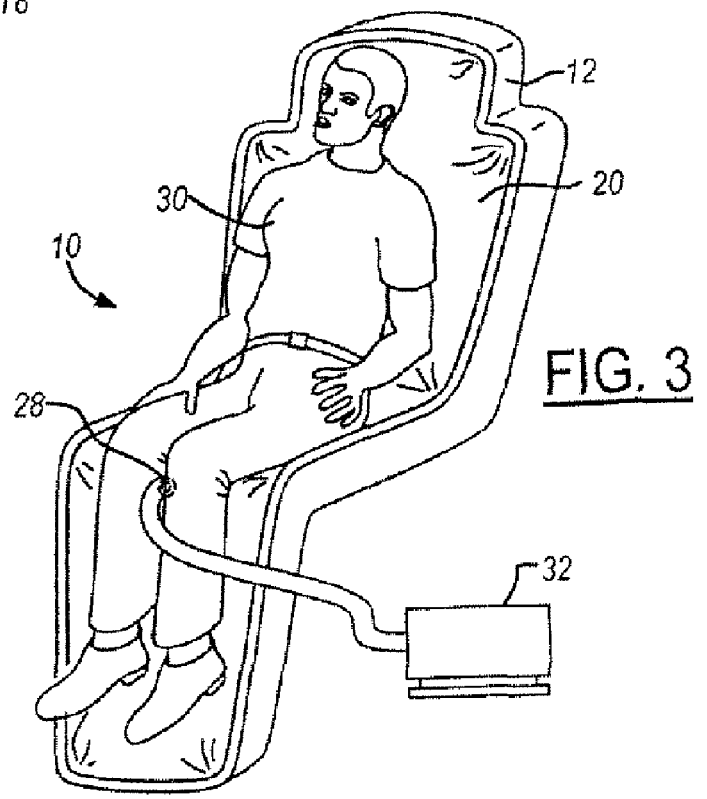

COMPOSITE SHELL SPACECRAFT SEAT

FEDERAL RESEARCH STATEMENT

The invention described herein was made in the performance of work under NASA Contract No. NAS8-01099 and is subject to the provisions of Section 305 of the National Aeronautics and Space Act of 1958 (72 Stat. 435:42 U.S.C. 2457.)

TECHNICAL FIELD

The present invention relates generally to seating for the crew of an aircraft or spacecraft and more particularly to full body support in the seat.

BACKGROUND ART

Advancements in space travel have made manned space flights more realistic for a larger variety of people. In the past, space missions had crewmember sizes that were much more generic. It has been standard that all members were relatively the same size and weight. In space travel today and as it is expected to change in the future, crewmembers are becoming more varied and people of many shapes and sizes need to be accommodated. Crew seats need to conform to crew sizes ranging from the smallest possible, for example a $5^{th}$ percentile Japanese female in shirt sleeves, to the largest possible, such as a $95^{th}$ percentile American male in an inflated space suit.

Crewmember comfort is of course a concern. But more importantly, the support and safety of the crewmembers throughout take-off, flight, and landing are the most critical of concerns. Current crew seats are a one-size-fits-all configuration. This arrangement does not provide sufficient support for crewmembers through all phases of the flight, ascent, zero-g, descent and landing.

Support of the crewmember in the seat during take-off, flight, and landing are a critical concern for manned space travel, especially when commercial space travel is on the brink of becoming more mainstream. Crewmember support is especially important during launch and re-entry phases of the flight when the forces on crewmembers are the greatest. The more complete the support of the crewmember's body during any phase of the flight will reduce the likelihood of injury to the crewmember throughout the mission.

SUMMARY OF THE INVENTION

Seat design for manned space travel has become more important as the shapes and sizes of crewmembers become more varied. A two-part seat construction providing full body support that is specific for each crewmember on an individual basis. The two-part seat construction can accommodate many sizes and shapes for crewmembers because it is reconfigurable and therefore reusable for subsequent flights. The first component of the two-part seat construction is a composite shell that surrounds the crewmember's entire body and is generically fitted to their general size in height and weight. The second component of the two-part seat is a cushion that conforms exactly to the specific crewmember's entire body and gives total body support in more complex environment.

The first component has integral fittings for attachment to the spacecraft, and the second component is attached to the first component. This allows the more generic first component to be attached in the same manner to the spacecraft and is pretty much independent on the size of the crewmember. The customized second component is installed in the first component and is formed to the crewmember's exact shape by drawing a vacuum on the cushion to conform the cushion to the crewmember's exact body contours. This cushion will remain fixed for the duration of the flight, or may be adjusted and changed as desired during the flight.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which:

FIG. 1 is a perspective view of the shell component of the seat of the present invention.

FIG. 2 is a perspective view with a partial cut-away of the cushion component and loose packing material of the seat of the present invention.

FIG. 3 is a perspective view of the seat assembly with the two components assembled and a crew member in position.

BEST MODES FOR CARRYING OUT THE INVENTION

Figure 4:
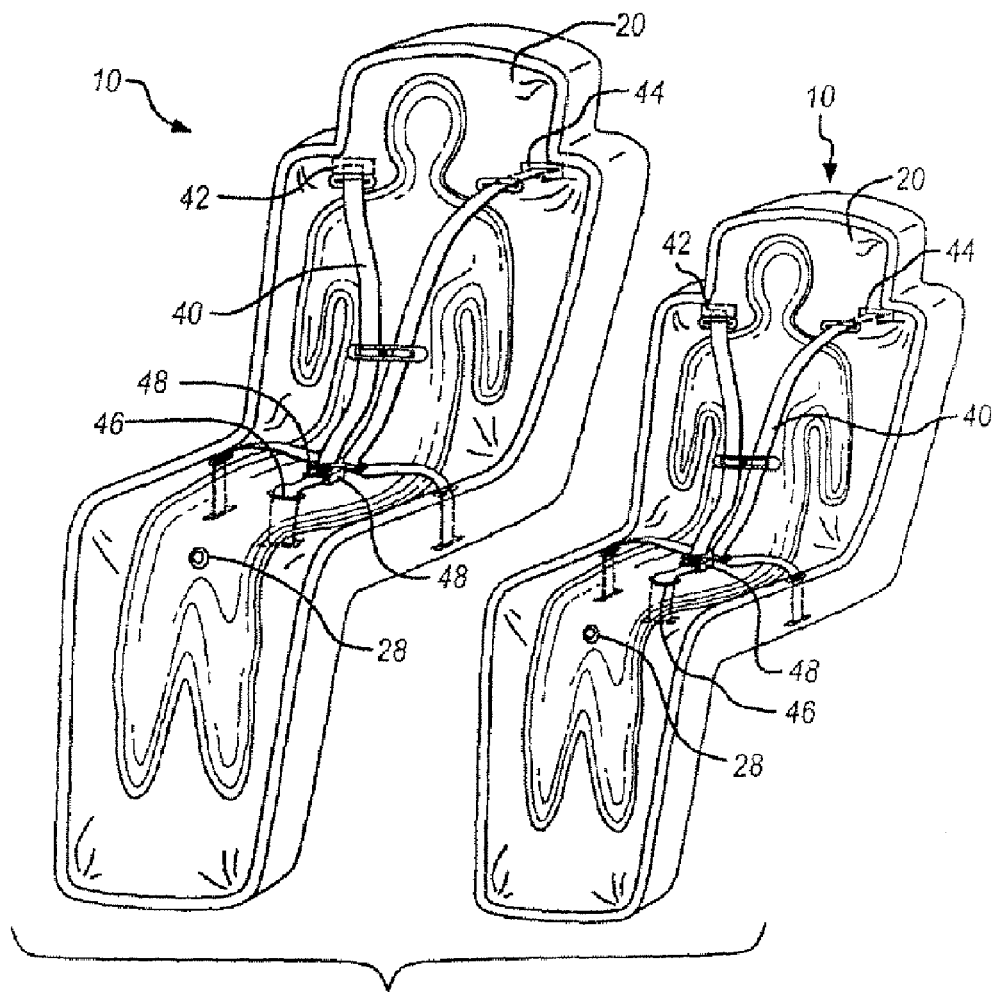
FIG. 4 is a perspective view of the molded assembled seat without the crew member after contouring of the crew member has been completed with a partial cut-away of the fixed packing material.

FIGS. 1 and 2 respectively show the two components 12, 20 of the seat assembly 10 as they appear before they are assembled and configured to the crewmember's body size and shape. Referring to FIG. 1, the shell 12 is a molded component that fully supports the entire body of a crewmember. The material of the shell 12 should be strong, but lightweight. A carbon-fiber composite is one example of a suitable material. However, it should be noted that one skilled in the art is capable of molding the shell component from any material that is strong, but lightweight.

The composite shell 12 can be provided in a plurality of sizes to accommodate a range of sizes, but remain generic as to the exact dimensions of a crewmember. For example, a shell of one size is provided for small to medium sized crewmembers and a shell of another size is provided for medium to large sized crewmembers. Each shell, independent of its generic size should have common mounting points 14. This way the different sized shells can be mounted in the same place onboard the vehicle, such as a spacecraft, without adjustments being required. The flexibility of this mounting design means that one spacecraft can easily accommodate a crew having multiple variations in body size and weight and a varying number of crewmembers for each flight. The seats 10 can also be easily changed out to reconfigure the spacecraft for a subsequent mission having a completely different crew. A seat can easily be added or removed. This way there will be no extra seats unnecessarily weighing down the vehicle should the number of crew members vary from flight to flight for a particular spacecraft.

The composite shell 12 supports the entire length of the crewmember's body from head 16 to toe 18. The full body support will distribute any load or shock that may be encountered during the flight evenly over the crewmember's entire body. During flight and especially during re-entry and touchdown, there is a possibility that a singular failure, such as in the landing system, could cause excessive shock, and full body support is important to protect the crewmember.

The material the composite shell 12 is molded from must be resilient enough to absorb any shock that may occur to a crewmember during launch, re-entry and landing. The composite shell 12 is designed to cover the entire length of the crewmember so that it can absorb and evenly distribute any force or shock it receives throughout the entire shell component 12 thereby minimizing direct damage at any one particular point of the seated crew member. FIG. 1 shows the seat in an upright seated position, and it should be noted that the seat can be molded in any configuration, reclining, fully reclined, etc., that is practical and feasible for the particular flight and the present invention is not limited to the configuration shown in FIG. 1.

Referring now to FIG. 2, the cushion component 20 of the seat assembly 10 is shown in partial cutaway. The cushion component 20 is a bag having a packing material 21 that conforms to the crewmember's body shape by drawing a vacuum on the bag while the crewmember is seated, see FIG. 3. Referring again to FIG. 2, the cushion 20 covers the surface of the shell 12 and fully supports the crewmember's entire body from head 22 to toe 24. The cushion 20 has attachments 26 for attaching the cushion to the shell which not shown in FIG. 2. The cushion 20 has a valve 28 for accepting a pump, not shown, to draw a vacuum on the cushion 20 and mold its packing material 21 to match the specific contours of whoever is seated in the cushion during the time the vacuum is being drawn. The valve 28 is located in an area that is convenient for the crewmember to access so that the initial contour setting, and any further changes to the contour setting, can be easily made by the seated crewmember. Once the air is evacuated from the cushion 20, the packing material 21 is fixed in place and it retains the exact shape of its occupant throughout the flight, or until it is reconfigured as desired. The cushion component 20 completely supports the crewmember's body in its exact contour throughout all phases of the flight.

The packing material 21 is easily altered in terms of its shape. Before applying the vacuum, the material is easily deformable and provides a soft cushion. Once the vacuum is applied, the packing material 21 of the cushion is fixed in position and the cushion 20 becomes close fitting and contoured to the shape of its occupant. The fixed contours remain until the cushion 20 is aerated again, such as by allowing air to re-enter the cushion 20 through the valve 28. Once the cushion is aerated, the packing material loosens, and the cushion is once again easily deformable. This provides flexibility in that the cushion can be used repeatedly for crewmembers of different sizes and shapes. The seat can be easily reconfigured from one crewmember to the next.

The packing material 21 is made up of individual bodies 23 that freely move against one another when air is in the cushion. These bodies 23 are tightly fitted against each other when air is removed from the cushion. The individual bodies 23 may be loose foam-like balls, or beads, or the like, and any suitable material may be used. The loose packing material 21 is easily moved or deformed when air is present. Once air is evacuated from the cushion 20, the packing material bodies 23 are fixed in place but the cushion 20 does not become hard. It remains soft and resilient to cushion the crewmember.

Referring now to FIG. 3, there is shown the shell 12 and the cushion 20 assembled together with a crewmember 30 seated in the seat assembly 10. The cushion 20 is attached to a pump 32 and a vacuum is drawn on the cushion 20 while the crewmember 30 is seated. The beanbag nature of the cushion will conform to the exact contours of the crewmember's body shape once the vacuum is drawn. The packing material, not shown in FIG. 3, is fixed in position and without air in the cushion, the individual bodies do not move about. The pump evacuates the proper amount of air to fix the packing material into place, yet keep the crewmember 30 free from being completely enclosed, or encased in the cushion 20.

Referring now to FIG. 4 fully assembled and contoured seats 10 of varying sizes and contours are shown without the crewmembers. Two sizes are shown. A first size accommodates larger crewmembers and a second size accommodates smaller crewmembers. The cushion 20 does not completely encase the crewmember so that the crewmember is free to leave the seat, move about the spacecraft, and then return to the fully molded, contoured seat 10. The packing material is fixed in position but remains resilient and soft to provide a comfortable cushion between the crewmember and the shell component 12.

A restraint system, such as a harness 40 is used to secure the crewmember in the seat during launch and re-entry. An example of one type of harness 40 is shown in FIG. 4. The harness system 40 may require predetermined openings 42, 44, 46 in the cushion 20 in order for the harness belt 48 to be attached to the shell 12 and accessible by the crew member. The configuration shown in FIG. 4 is for example purposes only and the seat assembly 10 can easily be modified to accommodate a wide variety of harness systems.

The fixed configuration of the shell component 12 has the advantage of being generic enough to be used for occupants of varying size, yet it still has the capability of being stowed, or nested easily as the size of the shell is pretty much uniform. The cushion component 20 has the advantage of being moldable, reusable and reconfigurable to accommodate a custom fit for each of a wide variety of crewmembers without having to manufacture a new seat for each crewmember. The full body support of the seat provides protection from potential hazards due to shock upon launch, re-entry and landing, minimizing damage and maximizing comfort of each occupant on an individual basis. The lack of complete enclosure of the crewmember allows freedom to easily leave the seat as necessary and return to it as necessary throughout the flight.

It should be noted that the placement of attachment points and attachment mechanisms used to attach the shell to the spacecraft and the cushion to the shell are not shown in detail. There are numerous arrangements possible and one skilled in the art is capable of determining the best attachments and attachment points based on the design of the spacecraft and seating arrangement.

It should also be noted that the valve and location for the vacuum pump attachment to the cushion are also not shown in any detail. This is another aspect that one skilled in the art is capable of accommodating based on a particular seat design and the spacecraft to which it is to be assembled.

Figure 5:
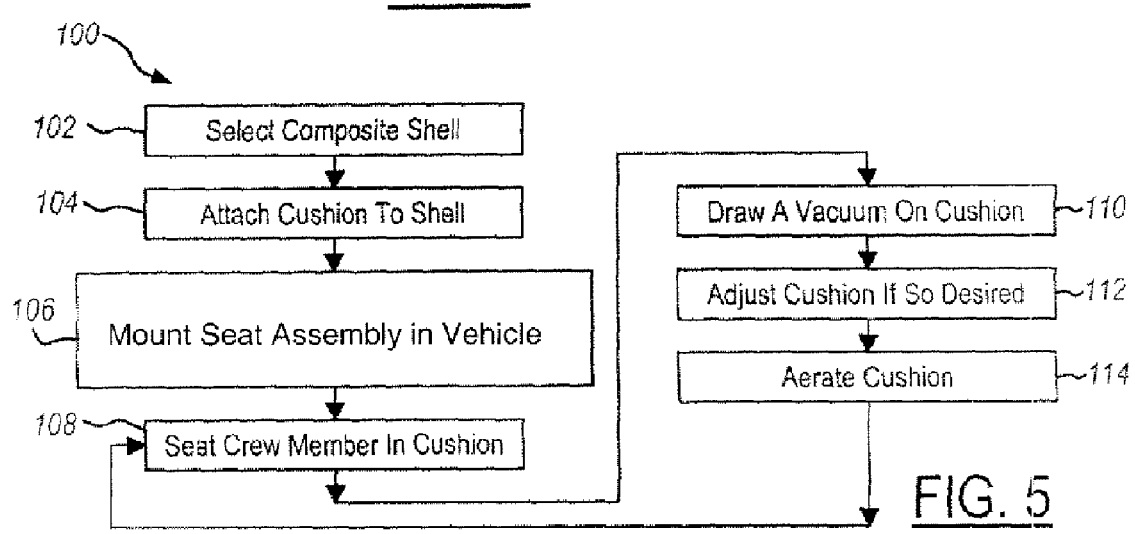
FIG. 5 is a method of customizing a two-component seat.

A method 100 for customizing a seat is shown in the flow chart of FIG. 5. The generic shells, either small or large, are selected 102 based on the number of and general size of the crewmembers. The cushion component is attached 104 to the shell component. The seat assembly is mounted 106 to the spacecraft. The crewmember is seated 108 on the cushion and a vacuum is drawn 110 on the cushion to fix the cushion to the contours of the crew member's entire body.

The cushion can remain customized throughout the duration of the flight, or it can be adjusted 112 by the crewmember as desired. Should the crew member want to reconfigure the seat, or should the seat need to be reconfigured for a different crew member, the cushion is aerated 114 and the fixed contours are eliminated, the crewmember is seated 108, and a vacuum is drawn 110 to reconfigure the cushion to the contours of the crew member's entire body.

The seat system supports, and is contoured to, the entire length of the crewmember's body, from head-to-toe. The full body support is important to distribute any load or shock that may be encountered during the flight. Because the crewmember's full body is supported, the load is evenly distributed over the crewmember's entire body, thereby preventing excessive shock to any one portion of the crewmember's body.

From the foregoing, it can be seen that there has been brought to the art a new and improved seat for space travel. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims.

What is claimed is:

1. A vehicle seat comprising:
   a shell component having a surface area that provides support for an occupant's entire body, the shell component having a plurality of mounting attachments at predefined points on the shell component;
   a cushion component that covers the surface area of the shell component, the cushion having a plurality of mounting attachments that mate to the plurality of mounting attachments of the shell component, the cushion having an aerated condition and a de-aerated condition, whereby the cushion component is reconfigurable;
   a packing material encased in the cushion component, the packing material being loose in the aerated condition of the cushion and fixed but not merged in the de-aerated condition of the cushion, such that the fixed packing material specifically conforms to the occupant's entire body and can be adjusted for different conditions or for different occupants.

2. The vehicle seat as claimed in claim 1 wherein the packing material is loose foam-like beads.

3. The vehicle seat as claimed in claim 2 wherein the cushion component further comprises a valve for receiving a vacuum pump to de-aerate the cushion component as desired and fix the packing material to conform to the occupant's entire body.

4. The vehicle seat as claimed in claim 1 further comprising:
   a harness system attached to the shell component for securing the occupant in the seat; and
   a plurality of openings in the cushion component for receiving the harness system attached to the shell and making it accessible to the occupant in the seat.

5. The vehicle seat as claimed in claim 1 wherein the shell component has a predetermined mounting configuration for attaching the shell component to the interior of a vehicle.

6. The vehicle seat as claimed in claim 5 wherein the shell component has a predetermined size that is capable of nesting with other shell components when not mounted in the vehicle.

7. The vehicle seat as claimed in claim 6 wherein the shell component has more than one predetermined size and is capable of nesting with other shell components having the same predetermined size, at least one predetermined sized shell component capable of supporting a first predetermined range of occupant size and at least another predetermined sized shell component capable of supporting a second predetermined range of occupant size that is different from the first predetermined range of occupant size.

8. A reconfigurable seating arrangement for a vehicle comprising:
   at least one attachment system in the vehicle;
   at least one shell component having a mounting system that matches the at least one attachment system in the vehicle and mounts thereto, the at least one shell component having a surface area that provides support for an occupant's entire body, the at least one shell component having a plurality of mounting attachments at predefined points on the at least one shell component;
   at least one cushion component that covers the surface area of the shell component, the cushion having a plurality of mounting attachments that mate to the plurality of mounting attachments of the at least one shell component for attaching the at least one cushion thereto, the at least one cushion having an aerated condition and a de-aerated condition whereby the cushion component is reconfigurable, the at least one cushion component having a packing material encased therein, the packing material being loose in the aerated condition of the at least one cushion component and fixed but not merged in the de-aerated condition of the at least one cushion component, such that the fixed packing material specifically conforms to the occupant's entire body and can be adjusted for different conditions or for different occupants.

9. The reconfigurable seating arrangement as claimed in claim 8 wherein the at least one shell component farther comprises:
   a first predetermined size for receiving an occupant in a first range of size, the first predetermined size shell having an attachment system for mounting the shell to the vehicle;
   at least a second predetermined size for receiving an occupant in a second range of size that is different from the first range of size, the at least a second predetermined size shell having an attachment system for mounting the at least a second predetermined size shell to the vehicle that is the same as the attachment system for the first predetermined size shell; and
   a combination of first predetermined size shells and second predetermined size shells chosen as needed based upon the number and sizes of occupants.

10. The reconfigurable seating arrangement as claimed in claim 8 further comprising:
    a harness system attached to the shell component for securing the occupant; and
    wherein the cushion component further comprises a plurality of openings in the cushion component for receiving the harness system attached to the shell and making it accessible to the occupant in the seat.

11. The reconfigurable seating arrangement as claimed in claim 10 further comprising:

a vacuum pump; and a valve on said at least one cushion for receiving the vacuum pump and de-aerating the at least one cushion to conform to the occupant of the at least one cushion.

12. The reconfigurable seating arrangement as claimed in claim 11 wherein the packing material for the cushion component is made up of loose foam-like beads.

13. A method for customizing a seat and seating arrangement in a vehicle comprising the steps of:

selecting a shell size based upon an occupant size, said shell having a plurality of mounting attachments at predetermined points thereon;

attaching a cushion to the shell, said cushion having an aerated condition and a de-aerated condition, said cushion attached to the shell in an aerated condition, said cushion being reconfigurable, and said cushion encasing a packing material, wherein said packing material is loose when said cushion is in an aerated condition and said packing material is fixed but not merged when said cushion is in a de-aerated condition and wherein said packing material after being fixed can be adjusted for different conditions or for different occupants;

mounting the seat in a vehicle;

seating an occupant in the cushion; and drawing a vacuum on the cushion to conform and fix but not merge said packing material within the cushion to any contours of the occupant and to hold the packing material in said fixed position.

14. The method as claimed in claim 13 wherein the step of selecting a shell size further comprises selecting a shell size from a plurality of shell sizes that meet a plurality of predetermined size ranges for occupant size.

15. The method as claimed in claim 14 farther comprising the step of selecting a plurality of shells in sizes based on a crew of more than one occupant.

16. The method as claimed in claim 13 farther comprising the step of adjusting the seat cushion after the vacuum has been drawn.

17. The method as claimed in claim 16 wherein the step of adjusting the seat cushion farther comprises;

aerating the cushion to loosen the packing material;

seating an occupant in the cushion; and drawing a vacuum on the cushion to conform the packing material within the cushion to any contours of the occupant and to hold the packing material in said fixed position.

18. The method as claimed in claim 14 wherein the step of mounting the seat in the vehicle further comprises having the same mounting arrangement for all shell sizes selected.

19. The method as claimed in claim 13 wherein the step of mounting the seat in the vehicle further comprises mounting the seat after the vacuum has been drawn on the cushion.

20. The method as claimed in claim 13 wherein the step of mounting the seat in the vehicle further comprises mounting the seat before the vacuum has been drawn on the cushion.

* * * * *